(12) United States Patent  (10) Patent No.: US 7,813,069 B2
Evans et al.  (45) Date of Patent: Oct. 12, 2010

(54) METHOD AND APPARATUS FOR CONTROLLING MOTION OF STORAGE MEDIA

(75) Inventors: Nigel Ronald Evans, Bristol (GB); Russell Ian Monk, Caldicot (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 399 days.

(21) Appl. No.: 12/023,126

(22) Filed: Jan. 31, 2008

(65) Prior Publication Data

US 2008/0212224 A1    Sep. 4, 2008

(30) Foreign Application Priority Data

Jan. 31, 2007    (GB) .................................. 0701811.2

(51) Int. Cl.
 *G11B 5/09* (2006.01)
(52) U.S. Cl. ...................................................... 360/53
(58) Field of Classification Search ................ 360/71, 360/53, 75, 31, 69; 711/156; 714/5, 6; 713/400
See application file for complete search history.

(56) References Cited

U.S. PATENT DOCUMENTS

| | | | |
|---|---|---|---|
| 6,229,661 B1 * | 5/2001 | Abe ............................. | 360/53 |
| 6,342,983 B1 | 1/2002 | Nonoyama et al. | |
| 6,604,204 B1 * | 8/2003 | Ozdemir et al. ............. | 713/400 |
| 6,657,803 B1 * | 12/2003 | Ling et al. ..................... | 360/53 |
| 6,690,532 B1 * | 2/2004 | Choo et al. .................... | 360/75 |
| 6,728,053 B2 * | 4/2004 | Choo et al. .................... | 360/53 |
| 6,862,151 B2 * | 3/2005 | Hoskins et al. ............... | 360/53 |
| 7,428,656 B2 * | 9/2008 | Lum et al. ..................... | 714/5 |
| 7,627,725 B2 * | 12/2009 | Yoshida ........................ | 711/156 |
| 7,702,954 B2 * | 4/2010 | Yoshida ........................ | 714/6 |
| 2001/0015868 A1 | 8/2001 | Goker | |
| 2005/0174914 A1 * | 8/2005 | Sugimura et al. ......... | 369/59.23 |

FOREIGN PATENT DOCUMENTS

EP    0720164 A2    7/1996

OTHER PUBLICATIONS

UK Intellectual Property Office Search Report dated May 30, 2007, UK App. No. GB0701811.2, 3 pp.

* cited by examiner

*Primary Examiner*—Fred Tzeng

(57) ABSTRACT

A method of controlling relative motion of a data storage medium on which data is stored in data groups comprising tracks extending across the storage medium and a rotatable transducer for reading data from the storage medium includes determining from the data groups a start reread data group at which a data reread process is to start following detection of a read error condition in a preceding data read process. The method also includes obtaining a reread track reference value for use in controlling that relative motion during the data reread process using a track reference value difference stored in at least one track of at least one data group that is to be reread during the data reread process and a track reference value that was used in controlling that relative rotation during the preceding data read process.

20 Claims, 3 Drawing Sheets

METHOD AND APPARATUS FOR CONTROLLING MOTION OF STORAGE MEDIA

CROSS-REFERENCE TO A RELATED APPLICATION

The present application claims the benefit of, and incorporates by reference, Great Britain Application No. 0701811.2, filed Jan. 31, 2007, and entitled "Method and Apparatus for Controlling Motion of Storage Media."

BACKGROUND

Data may typically be written onto a storage medium, such as magnetic or magneto-optic tape, in the form of a sequence of data blocks identified by a unique block identifier. A varying number of these data blocks may be grouped together to form a data group or other group that may be used to designate certain areas of the medium (for example "End Of Data"). The data group is typically the smallest entity that can be written to this medium and contains user data.

The operation of adding new data groups to a medium which already has existing data groups written upon it is usually referred to as "appending." In addition data groups may be written over previously written data with the result that there may be a boundary at one or both ends of the newly written data between previously written and the newly written data. For convenience, in the description that follows such newly written data is also referred to as "appended."

One method of storing and reading data on tape media is to use helical scan recording. In a helical scan recording/read apparatus (usually referred to as a 'tape drive') data is recorded on and read from a tape by a rotating drum carrying one or more electromagnetic heads. The tape is moved by a motor driven capstan along a path extending between two tape reels and partially around the drum. The plane of rotation of the drum is inclined to the plane of the tape so that the electromagnetic head(s) traverse the tape along successive tracks extending across the width of the tape at an angle to its centreline.

To obtain optimum data retrieval during a read operation, the electromagnetic read head(s) of a helical scan tape drive have to "lock" on the data on the tape so as to accurately follow the tracks across the tape. This requires control of the relative motion of the tape and drum by controlling rotation of the drum and/or movement of the tape by the capstan. The control process includes using a track reference value ("Time-Tracking measurement value"), which is representative of the average spacing of the data tracks from the lower edge of the tape.

The conditions during an append operation may differ from those prevailing during a previous write operation resulting in the tracks of the appended data groups being at a different height to the tracks of the previously written data. This is most likely to happen where the appended data is written by a different tape drive, although other factors, such as temperature, wear or changes of settings of the tape drive components or wear of the tape, may also produce a change in cases in which the same tape drive is used.

Often, a tape drive can cope with differences in the height of the tracks before and after the append point. However, the difference can cause the tape drive to lose lock at the append point. If that happens, the tape drive has to back over the append point and perform a Time-Tracking calibration, measuring the height of the data after the append point and sometimes before the append point as well. Sometimes this Time-Tracking calibration and subsequent retries fail, even though the tape drive has a good error performance. This is generally due to the appended data being written at an extreme height difference or because there is some feature of the written data at the append point where the Time-Tracking measurements are performed that causes an inadequate measurement (for example a localised bad error rate).

Even when Time-Tracking calibration is successful, the process of making the measurements slows the operation of the tape drive and leads to increased wear of the tape.

BRIEF DESCRIPTION OF THE DRAWINGS

In order that the invention may be well understood, some embodiments thereof, which are given by way of example only will now be described with reference to the drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The embodiment of data transfer apparatus described below is based on the DDS technology and is for operation in accordance with the DAT 160 format. Initially the main components of the data transfer apparatus will be described and thereafter modifications that implement an embodiment of this invention will be described.

Figure 1:
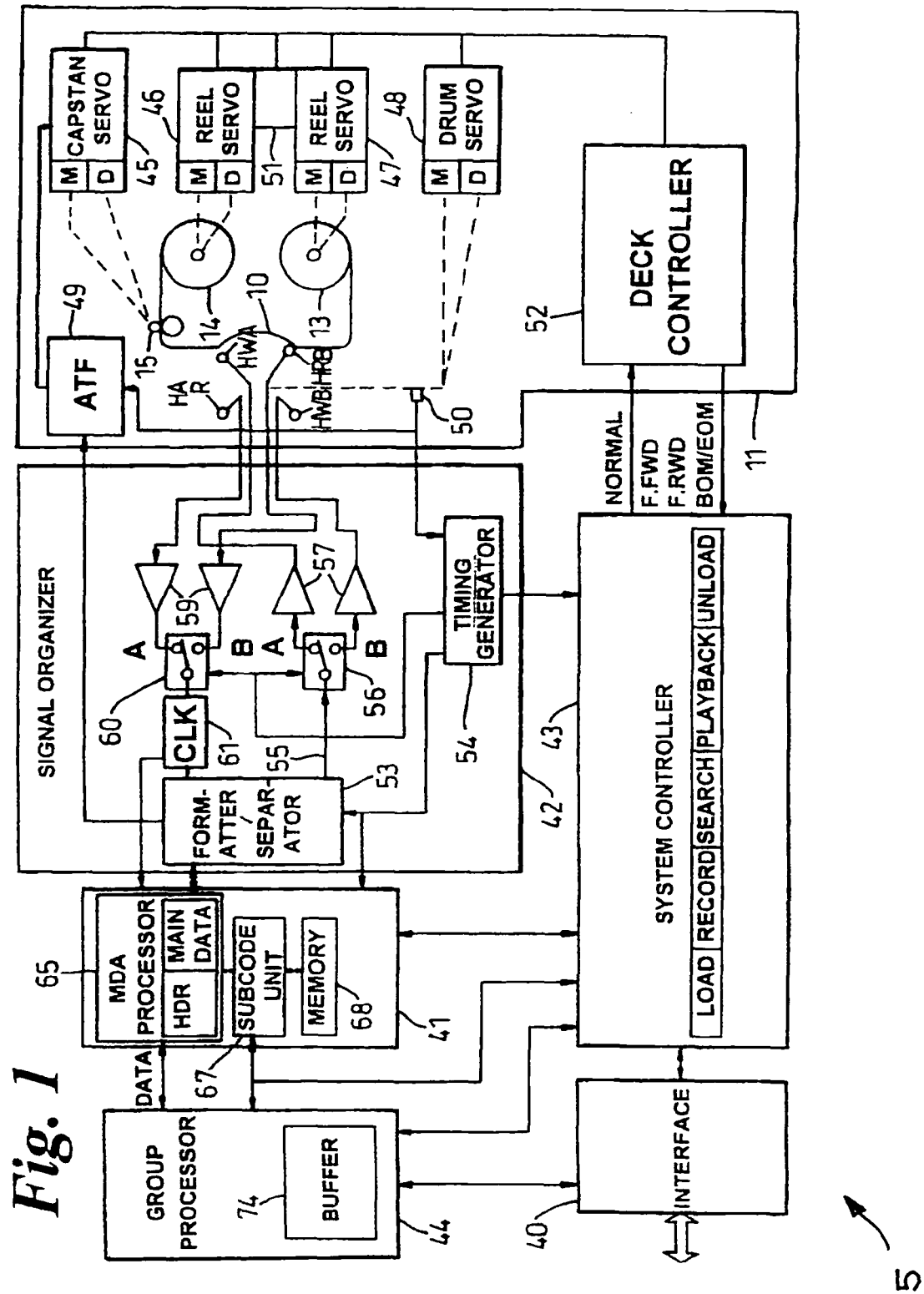
FIG. 1 is a block diagram of the main components of a data storage apparatus for helical scan recording.
Figure 2:
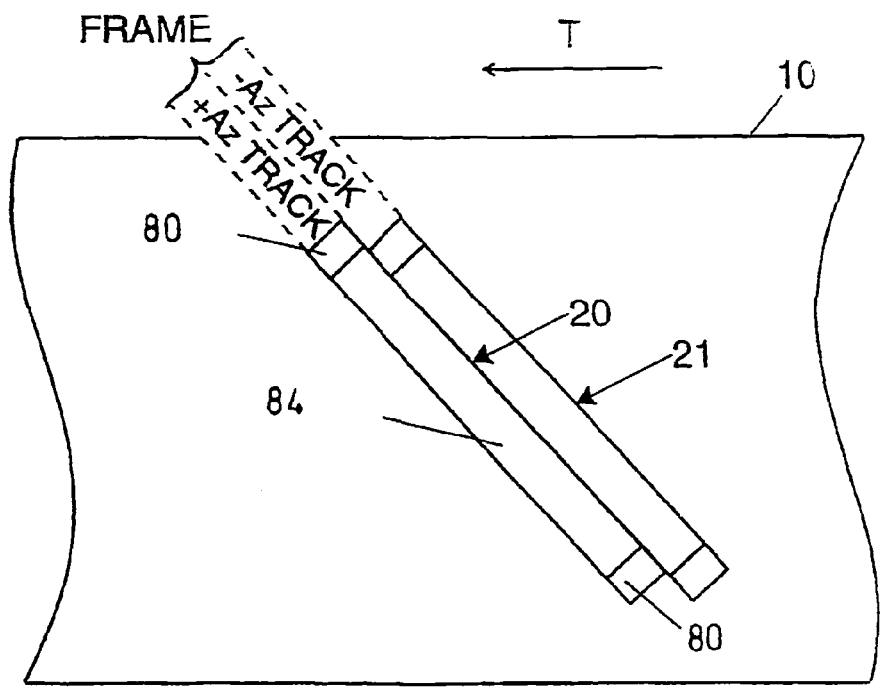
FIG. 2 is a diagrammatic representation of two data tracks recorded on a tape during helical scan recording.

Referring to FIG. 1, the data transfer apparatus is a tape storage and retrieval apparatus ("tape drive") 5 that utilizes a helical scan technique for storing data in oblique tracks on a recording tape in a format similar to that used for the storage of PCM audio data according to the DAT Conference Standard (June 1987 Electronic Industries Association of Japan, Tokyo, Japan). The tape drive 5 is, however, adapted for storing computer data rather than digitised audio information. The tape drive 5 includes a helical-scan tape deck 11 in which tape 10 passes at a predetermined angle across a rotary head drum (not shown) with a wrap angle of approximately 90°. In operation, the tape 10 is moved from a supply reel 13 to a take-up reel 14 by rotation of a capstan 15 against which the tape is pressed by a pinch roller; at the same time, the head drum is rotated. The head drum houses two diametrically opposed electromagnetic read heads HRA, HRB and two diametrically opposed electromagnetic write heads HWA, HWB, offset by 90°. In known manner, the write heads HWA, HWB are arranged to write overlapping oblique tracks 20, 21 (FIG. 2) across the tape 10. The track 20 written by head HWA has a positive azimuth while the track 21 written by head HWB has a negative azimuth; each pair of positive and negative azimuth tracks constitutes a frame. The tracks 20, 21 are used to store data provided to the apparatus (main data), together with items of auxiliary information known as sub-codes, which will be described in more detail below. The tracks also contain synchronization bytes ('sync bytes') to enable data byte boundaries to be identified, and which are used to generate timing signals for controlling tape movement relative to the electromagnetic heads HWA, HBW, HRA and HRB. Pre-amble blocks included in the tracks 20, 21 contain timing data patterns to facilitate timing synchronization on playback.

In addition to the tape deck 11, the tape drive 5 includes an interface unit 40 for interfacing the tape drive with a computer (not shown); a group processor 44 and a frame data processor 41 for processing main data and sub-codes into and out of a Main Data Fragment; a signal organizer 42 for composing/decomposing the signals for writing/reading a track and for appropriately switching the four heads HWA, HWB, HRA and HRB and a system controller 43 for controlling the operation of the tape drive in response to commands received from a computer via the interface unit 40. Each of the main component units of the tape drive 5 will be further described below.

The tape drive 5 is arranged to respond to commands from a computer to load/unload a tape, to store a data record and other logical segmentation marks, to search for a selected record using the segmentation is marks, and the read back the next record.

The interface unit 40 is arranged to receive the commands from the computer and to manage the transfer of data records and logical data segmentation marks between the tape drive 5 and computer. Upon receiving a command from the computer, the interface unit 40 passes it on to the system controller 43 which, in due course will send a response back to the computer via the interface unit indicating compliance or otherwise with the original command. Once the tape drive has been set up by the system controller 43 in response to a command from the computer to store or read data, then the interface unit 40 will also control the passage of records and segmentation marks between the computer and the group processor 44.

During data storage the group processor 44 is arranged to segment the data provided to it in the form of data records into data packages (referred to as "data groups") each containing an amount of data corresponding to a fixed number of frames (twenty three for the DAT 160 Format), with an index that holds information regarding the logical segmentation of the data (record divisions, file marks) which is generated by the processor 44. Each frame comprises two tracks 20, 21. The group processor 44 also generates certain sub-codes whose contents are group-dependent or concern the logical segmentation of data. To facilitate these tasks and the transfer of data to and from the group processor 44, the latter is provided with a large buffer 74 which is arranged to hold several (for example, three) group's worth of data.

Once a data group, including its index, has been assembled, it is transferred a frame at a time to the frame data processor 41. In order to speed the transfer of data between the group processor 44 and frame data processor 41, it is advantageous for the frame data processor 41 to be managed in terms of groups for receiving data from the group processor 44. In other words, during recording, the frame data processor 41 is told by the group processor 44 when a group is ready for processing after which the frame data processor 41 accesses the frames of the group autonomously from the buffer 74.

When data is being read from tape, the group processor 44 is arranged to receive main data on a frame-by-frame basis, the data being written into the buffer 74 in such a manner as to build up a group. The group processor 44 can then access the group index to recover information on the logical organization (record structure, file marks) of the main data in the group. Using this information the group processor can pass the requested record or segmentation mark to the computer via the interface unit 40.

The frame data processor 41 functionally comprises a Main-Data-Area (MDA) processor 65 and a sub-code unit 67 with an associated electronic memory 68 for tape usage data (in practice, these functional elements may be constituted by a single microprocessor running appropriate processes under program control).

The sub-code unit 67 is arranged to provide sub-codes to the MDA processor 65 as required during recording and to receive and distribute sub-codes from the processor 65 during playback. Dependent on their information content, sub-codes may be generated/required by the group processor 44 or the system controller 43. In the case of non-varying sub-codes such as certain recording parameters, the sub-codes may be permanently stored in the unit 67. Furthermore, frame-dependent sub-codes may conveniently be generated by the sub-code unit 67 itself.

The MDA processor 65 is arranged to process a frame's worth of main data at a time together with the associated sub-codes. Thus during recording, the MDA processor 65 receives a frame's worth of main data from the group processor 44 together with sub-codes from the unit 67. On receiving the main data the processor 65 interleaves the data, and calculates error correcting codes and parity values, before assembling the resultant data and sub-codes relating to the two tracks making up a frame. Before assembling the main data with the sub-codes, scrambling (randomising) of the data may be effected to ensure a consistent RF envelope independent of the data content of a track signal.

During playback, the MDA processor 65 effects a reverse process on the contents of the same frame. Unscrambled error-corrected and de-interleaved main data are passed to the group processor 44 and sub-codes are separated off and distributed by the subcode unit 67 to the group processor 44 or system controller 43 as required.

The signal organizer 42 comprises a formatter/separator unit 53 which during recording (data writing) is arranged to assemble the track contents provided by the frame data processor 41, to form the signal including sync bytes to be recorded on each successive track. The necessary preamble patterns are also inserted into the track signals where necessary by the formatter/separator unit 53. Timing signals for coordinating the operation of the formatter/separator unit 53 with rotation of the electromagnetic heads HWA, HWB, are provided by a timing generator 54 fed with drum position signals output by a pulse generator 50 responsive to head drum rotation and located in the tape deck 11. The track signals output on line 55 from the unit 53 are passed alternately to head HRA and head HRB via a head switch 56, respective head drive amplifiers 57, and a rotary transformer (not shown) which is incorporated in the rotary head drum and which provides contact-less connection to the heads HRA, HRB, HWA and HWB. The head switch 56 is operated by appropriate timed signals from the timing generator 54.

During playback (data reading) the track signals alternately generated by the heads HRA and HRB are fed via the rotary transformer, respective read amplifiers 59, a second head switch 60, and a clock recovery circuit 61, to the input of formatter/separator unit 53. The operation of the head switch 60 is controlled in the same manner as that of the head switch 56. The formatter/separator unit 53 now serves to generate signals indicating the timing of the predetermined regions (incorporating the sync bytes) in the track signals, to supply the timing signals to an automatic track following (ATF) circuit 49 in the tape deck 11, and to pass the track contents to the frame data processor 41. Clock signals are also passed to the processor 41 from the clock recovery circuit 61.

During reading, the system controller 43 also controls the timing of the read cycles to ensure that the read heads HRA and HRB do not start reading the tracks 20, 21 too early or too late. For this purpose the system controller 43 monitors various parameters including the track reference value ("Time-Tracking measurement value"). The Time-Tracking measurement value is the average is of a series of measurements (for example 128) representative of the height of the tracks from the lower edge 26 of the tape (usually referred to as the "reference tape edge"). As the track height increases or decreases, so the read heads HRA and HRB need to start reading later or earlier in the read cycle. The system controller 43 accordingly maintains a Time-Tracking measurement value and uses this as a reference value in controlling the timing of the read cycle. Specifically, a delay between the occurrence of a signal generated at a predetermined angular position of the drum and a reference signal provided in the tracks is measured and the relative motion of the tape 10 and drum is controlled to maintain the measured delay in a predetermined relationship with the Time-Tracking measurement value.

The tape deck 11 has four servos, namely a capstan servo 45 for controlling the rotation of the capstan 15, first and second reel servos 46, 47 for controlling rotation of the reels 13, 14 respectively, and a drum servo 48 for controlling the rotation of the head drum. Each servo includes a motor M and a rotation detector D both coupled to the element controlled by the servo. Associated with the reel servos 46, 47 is a detector 51 for sensing the ends of the tape: beginning of media (BOM) and end-of media (EOM); this detector 51 may be based for example on motor current sensing, as the motor current of whichever reel is being driven to wind in tape (dependent on the direction of tape travel) will increase significantly upon stalling of the motor at BOM/EOM.

The operation of the tape deck 11 is controlled by a deck controller 52 which is connected to the servos 45 to 48 and to the BOM/EOM detector 51. The controller 52 is operable to cause the servos to advance the tape, (either at normal speed or at high speed) through any required distance. This control is effected either by energizing the servos for a time interval appropriate to the tape speed set, or by feedback of tape displacement information from one or more of the rotation detectors D associated with the servos, by extracting logical position information from the sub-codes.

The deck controller 52 is itself governed by control signals issued by the system controller 43. The deck controller 52 is arranged to output to the controller 43 signals indicative of BOM and EOM being reached.

The system controller 43 serves both to manage high-level interaction between the computer and tape drive 5 and to co-ordinate the functioning of the other units of the tape drive in carrying out the basic operations of Load-Record-Search-Playback-Unload requested by the computer. In this latter respect, the system controller 43 serves to co-ordinate the operation of the tape deck 11 with the data processing portion of the tape drive.

In controlling the tape deck 11, the system controller 43 can request the deck controller 52 to move the tape at the normal read/write speed (Normal), or to move the tape forwards or backwards at high speed, that is Fast Forward (F.FWD) or Fast Rewind (F.RWD), or to move the tape forward at a speed that is a specified fraction of the normal read/write speed while Time-Tracking calibration measurements are made. The speed used for Time-Tracking measurements is usually slower than the normal read/write speed; for example, 14/32 of the normal speed.

Figure 3:
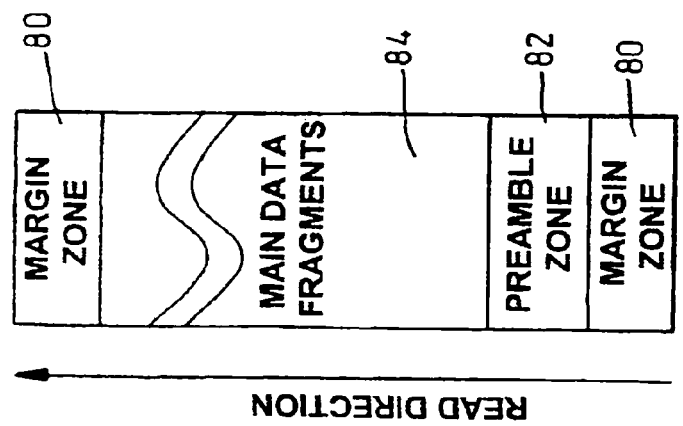
FIG. 3 is a block diagram representing the structure of a data track recorded by helical scan recording.

Having described the tape drive 5 in detail, the structure of the data and in particular the sub-codes will now be described with particular reference to DAT 160. In the DAT 160 scheme, data to be recorded is assembled into basic data groups. Each data group is divided into twenty three frames, each frame being written onto tape in the form of two adjacent tracks of opposite azimuth. Referring to FIG. 3, each track consists of two margin zones 80, a preamble zone 82, and a main data zone 84 comprising a series of 96 Main Data Fragments.

Figure 4:
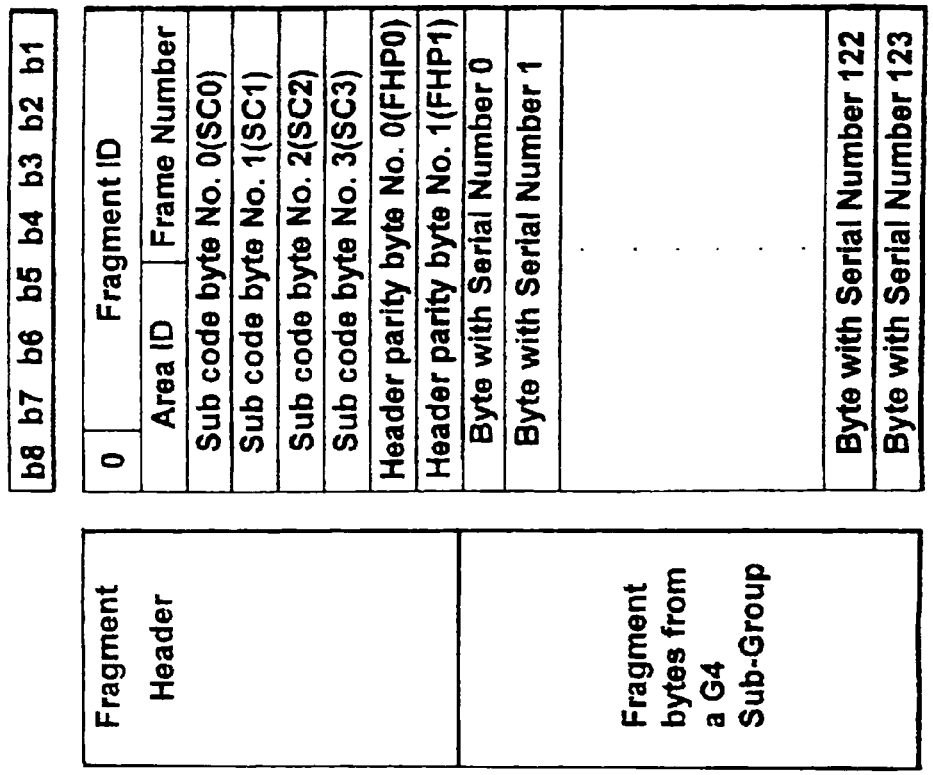
FIG. 4 is diagram representing a Main Data Fragment of a data track as shown in FIG. 3.

The structure of a Main Data Fragment is shown in FIG. 4. From this it will be seen that each Main Data Fragment has a fragment header of eight bytes followed by 124 data bytes. Of the header bytes, four bytes identified SC0 to SC3 contain one pack item of sub-code information. Sub-code information is embedded along each track within the fragment header. The sub-code information specifies information such as the running number of the group, the number of separators written since the beginning of the tape, the number of records written since the beginning of the tape, information about the track content and information about the history of the tape. The sub-code information is arranged as 4-byte pack items and, in DAT 160, there are 16 different pack items and 384 Main Data Fragments per track and so, if all 16 pack items were repeated in a track, each track would contain 6 of any particular pack item.

When the tape drive 5 is about to append a new data group(s), it must first determine the Time-Tracking measurement value of the existing data group immediately prior to the append point after which the new data group(s) are to be written. This value is obtained using a real time measurement process that includes operating the capstan 15 such that the tape 10 is moved past the drum at a speed different to its normal speed during read and write operations. The capstan 15 is operated in such a way that the data group makes multiple passes of the drum to allow multiple measurements of the track heights in the data group to be made. Once it is judged that a sufficient number of measurements have been made, the measurements are averaged to obtain the Time-Tracking measurement value for the data group. A detailed description of a process that the tape drive 5 can operate to obtain the Time-Tracking measurement value can be found in EP 0 671 735 (Hewlett-Packard Ltd), the content of which is incorporated herein by reference.

The appended data groups will always be written at the tape drive's known nominal write height. The tape drive 5 does not attempt to write the new data at the same height as the tracks of the data groups prior to the append group. Thus, there may be a difference in the track heights before and after the append point. The difference between the Time-Tracking measurement value for the data group immediately prior to the append point and the known track height of the new data group(s) (which is nominally zero) is determined as a Time-Tracking difference value, which may be a positive or negative value. The value of this difference is supplied to the frame data processor 41 to store it in the subcode unit 67. The subcode unit 67 sets the bytes of pack item no 13 to specify in binary the value for the Time-Tracking height difference. Accordingly, the Time-Tracking difference value is stored in the tracks 20, 21 of the newly appended data group(s).

When the tape drive 5 commences a read operation, it first carries out a Time-Tracking calibration to obtain a Time-Tracking measurement value for the first data group from which data is to be read. The controller 43 makes this value available to the ATF unit 49, which uses it as a track reference value in performing the control process by which the relative motion of the tape 10 and drum is controlled during the read operation so that the respective read heads HRA, HRB lock onto the successive tracks 20, 21 respectively.

If the tape drive 5 loses lock at an append point, as indicated, for example, by an unacceptably high error rate in the read data or a read failure, the capstan 15 is reversed to move the tape 10 back past the drum. While the tape is reversing, the read heads HRA, HRB will cross several tracks during each sweep, allowing the stored Time-Tracking difference value to be read. The tape drive can then perform a read retry (data reread process) without performing a Time-Tracking calibration by simply modifying the Time-Tracking measurement value at the append point using the Time-Tracking difference value. Specifically, in this embodiment, the Time-Tracking difference value is added to the Time-Tracking measurement value used in controlling relative motion of the tape and drum during the preceding data read process to obtain a modified Time-Tracking measurement value for the data reread process.

It will be appreciated that having used the modified Time-Tracking measurement value to complete the data reread process, the tape drive 5 seamlessly continues to read data using the modified Time-Tracking measurement value as the track reference value until all of the data requested by the computer has been retrieved or a further data error condition is detected.

If a further data read error condition is detected, the process of reversing the tape motion and obtaining a Time-Tracking measurement value for the "new" unread data groups is repeated and a new modified Time-Tracking measurement value is obtained for the new data reread process in the same way as before. Thus, it will be appreciated that the modified Time-Tracking measurement value obtained for a data reread process may be obtained by adding a Time-Tracking difference value to a Time-Tracking measurement value obtained using a real time measurement process or to a previously modified Time-Tracking measurement value. It is, thus, possible that during a read operation a succession of modified Time-Tracking measurement values will be used.

In embodiments in which a last append absolute frame number value is stored in the subcode of the data tracks 20, 21, the system controller 43 can make use of this information to accurately determine whether the data read error condition originates at an append point. Thus, the system controller 43 can make a determination as to whether the error is likely to be the product of track height differences at an append point and use that information in deciding whether to initiate a reread process using the Time-Tracking difference value. A methodology for storing the last append absolute frame number in the subcode of the data tracks 20, 21 using the tape drive 5 and subsequently reading that number is described in U.S. Pat. No. 6,526,482 (Hewlett-Packard Company and Sony Corporation), the content of which is incorporated herein by reference.

In the embodiment, when the tape drive 5 is about to append a new data group(s), it determines the Time-Tracking measurement value of the existing data group immediately prior to the append group using a real time measurement process. In an alternative embodiment, a Time-Tracking measurement value for the relevant data group is first sought in a memory within the tape drive. Typically, if the relevant data group has been written to or read from relatively recently, the Time-Tracking measurement value will be cached in memory. There are separate caches for values associated with read operations and values associated with write operations. Usually, data is deleted from these caches after a set holding period, for example four minutes. Thus, if a Time-Tracking value can be found in memory, it should be sufficiently "fresh" to be valid and can be used to save running a Time-Tracking calibration process. As previously noted, running Time-Tracking calibration processes slows down the operation of the tape drive and causes additional wear to the read heads and tape. If a Time-Tracking value cannot be found in memory, the system controller 43 can then initiate a Time-Tracking calibration process to obtain a value using measurements.

Figure 5:
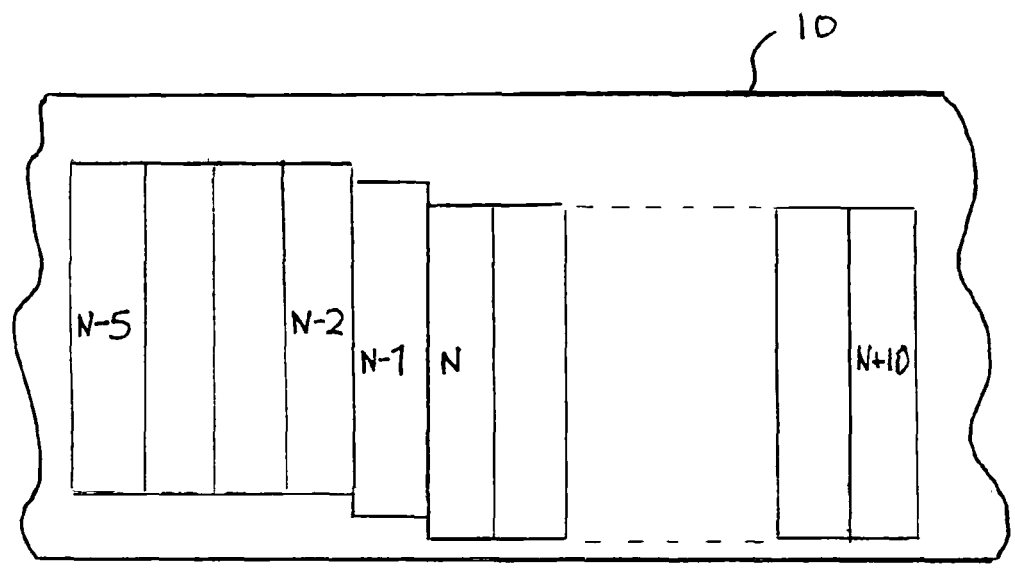
FIG. 5 is a block diagram illustrating an aspect of a data reading process.

Referring to FIG. 5, the data reread process may be modified to cope with reading data from storage media that have multiple appended data groups in close proximity. A first batch of data groups N−5 to N−2 is stored on the tape 10 and were written by a first tape drive 5. Subsequently, data group N−1 and successive data groups (not shown as they have subsequently been written over) were written to the tape by a second tape drive 5. Subsequently, a third tape drive 5 has written data groups N to N+10 over all but one of the data groups written by the second tape drive. There are thus two append points: between data groups N−2 and N−1 and between data groups N−1 and N. During a read operation commencing at N−5, data is successfully read from data groups N−5 to N−2. However, the read heads lose lock on the data tracks in passing over one or the other of the append points.

Following detection of the read error condition, the read process is stopped and the tape drive reversed to wind the tape back for a reread process. As described above, a modified Time-Tracking measurement value is determined for the append point between data group N−1 and N. However, due to the close proximity of the append point between data group N−1 and data group N−2, the read heads may not have locked onto the data tracks of data group N−1 so as the heads sweep over the tape passing over the append point between N−1 and N−2 and so the modified Time-Tracking measurement value will not be able to ensure that the heads are locked on the data tracks of the data groups N to N+10 with the result that another read error condition is detected, causing the tape drive to be reversed and another reread process initiated. The system controller may simply repeat the previous reread process (it may do this a preset number of times) to see whether a satisfactory read can be obtained. Either after the first reread failure or the preset number of failures, the system controller initiates an enhanced reread process. In this process, the Time-Tracking measurement value used during reading of data blocks N–5 to N–2 is used together with the Time-Tracking difference value stored in data group N–1 to work out a first modified Time-Tracking measurement value and the first modified Time-Tracking measurement value is used together with the Time-Tracking difference value stored in data group N to work out a second modified Time-Tracking measurement value. The three values are made available to the ATF 49 allowing a seamless switch in the track reference value used to control the relative motion of the tape and drum as the electromagnetic heads HRA, HRB sweep over the successive tracks 20, 21 of the data groups N–2, N–1 and N, so ensuring the heads remain locked on the data tracks.

The tape drive may be operable to initiate the enhanced reread process only after a preset number of failures. Alternatively, the tape drive may be operable to have the last append absolute frame value stored in the data groups searched over a preset number of data groups around the data group for which the read error condition is detected to determine whether there is more than one append point in the area. If multiple append points are detected, an enhanced reread process can be initiated as the first reread process.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of controlling relative motion of a data storage medium on which data is stored and a rotatable transducer for reading data from said storage medium, the data being stored in data groups comprising tracks extending across the storage medium and the method comprising:
   determining from said data groups a start reread data group at which a data reread process is to start following detection of a read error condition in a preceding data read process; and
   obtaining a reread track reference value for use in controlling said relative motion during the data reread process using a track reference value difference stored in at least one track of at least one data group that is to be reread during said data reread process and a track reference value that was used in controlling said relative rotation during said preceding data read process.

2. A method as claimed in claim 1, wherein said reread track reference value is obtained by adding said track reference value difference to the track reference value that was used in controlling said relative rotation during said preceding data read process.

3. A method as claimed in claim 1, comprising reading said track reference value difference while the storage medium is being reversed following detection of said read error condition.

4. A method as claimed in claim 1, wherein said start read data group is the first data group written or written over existing data following an append point.

5. A method as claimed in claim 1, wherein said track reference value difference is read from at least a plurality of tracks of said start reread data group.

6. A method as claimed in claim 1, wherein said track reference value used in controlling said relative motion during the preceding read process is an indication of an average spacing of the tracks of a data group that was read from first during the preceding data read process from a reference edge of the storage medium.

7. A method as claimed in claim 1, wherein said preceding data read process comprised a data reread process and said track reference value used in controlling said relative motion during the preceding data read process was a reread track reference value that was obtained using a track reference value difference stored in at least one track of at least one data group from which data was reread during the preceding data read process and a track reference value that was used for controlling said relative motion in a data read process that immediately preceded said preceding data read process.

8. Apparatus for controlling relative rotation of a data storage medium on which data is stored and a rotatable transducer for reading data from said storage medium, said data being stored in data groups comprising tracks extending across said storage medium and the apparatus comprising:
   means for identifying from said data groups a start reread data group at which a data reread process is to start following detection of a data read error condition in a preceding data read process;
   means for reading a track reference value difference stored in at least one track of at least one data group from which data is to be reread during said data reread process;
   means for determining a reread track reference value for use in controlling said relative rotation during said data reread process using said data track reference value difference and a track reference value used in controlling said relative rotation during the preceding data read process; and
   control means for using said reread track reference value in controlling said relative rotation during said data reread process.

9. Apparatus as claimed in claim 8, wherein said means for determining determines said reread track reference value by adding said track reference value difference to the track reference value that was used in controlling said relative rotation during said preceding data read process.

10. Apparatus as claimed in claim 8, wherein said means for reading is operable to read said track reference value difference while a means for moving the storage medium moves the storage medium backwards following detection of said read error condition.

11. Apparatus as claimed in claim 8, wherein said means for identifying is operable to identify the first data group written or written over existing data at an append point as the start reread data group.

12. A method of storing data for use in controlling motion of a data storage medium relative to a rotatable transducer, data being stored on said data storage media in data groups comprising tracks extending across the data storage medium and the method comprising:
   determining a previously written data group after which at least one new data group is to be appended or written over existing data stored on the data storage medium;
   obtaining a track reference value suitable for controlling said relative motion for said previously written data group;
   determining a track reference value difference value based on said track reference value for said previously written data group and a track reference value for said at least one new data group; and
   storing said track reference value difference value in at least one track of said at least one new data group.

13. A method as claimed in claim 12, wherein said track reference value for said previously written data group is obtained by a real time measurement process.

14. A method as claimed in claim 12, wherein said data track reference value for said previously written data group is obtained by reading a memory.

15. A method as claimed in claim 14 comprising first reading said memory and if a track reference value for said previously written data group is not obtainable from said memory, obtaining said value using a real time measurement process.

16. A method as claimed in claim 12, wherein said track reference value for said previously written data group and said track reference value for said at least one new data group are respective indications of an average spacing of the tracks of the data groups from a reference edge of the data storage medium.

17. Apparatus for storing data for use in controlling motion of a data storage medium relative to a rotatable transducer, data being stored on said data storage medium in data groups comprising tracks extending across the storage medium and said apparatus comprising:

- data assembly means for assembling said data into at least one new data group to be written onto said storage medium;
- appendancy determining means for determining whether said at least one new data group is to be written over existing data or appended to existing data stored on the storage medium and determining a previously written data group after which the at least one new data group is to be written;
- means for obtaining a track reference value for the previously written data group;
- means for determining a track reference value difference value based on said reference value for the previously written data group and a track reference value for the at least one new data group;
- means for incorporating said data track reference value difference value in at least one track of the at least one new data group; and
- means for writing said at least one new data group on said storage medium.

18. Apparatus as claimed in claim 17, wherein said means for obtaining a track reference value for the previously written data group comprises means for obtaining said value using real time measurements.

19. Apparatus as claimed in claim 17, wherein said means for obtaining a track reference value for the previously written data group comprises means for obtaining said value from a memory.

20. Apparatus as claimed in claim 17, wherein said track reference value for said previously written data group and said data track reference value for said at least one new data group are respective indications of an average spacing of the tracks of the data groups from a reference edge of the data storage medium.

* * * * *